(12) United States Patent
Wadia et al.

(10) Patent No.: US 8,348,592 B2
(45) Date of Patent: Jan. 8, 2013

(54) INSTABILITY MITIGATION SYSTEM USING ROTOR PLASMA ACTUATORS

(75) Inventors: Aspi Rustom Wadia, Loveland, OH (US); Seyed Gholamali Saddoughi, Clifton Park, NY (US); Clark Leonard Applegate, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1508 days.

(21) Appl. No.: 11/966,473

(22) Filed: Dec. 28, 2007

(65) Prior Publication Data

US 2010/0284786 A1    Nov. 11, 2010

(51) Int. Cl.
    *F01D 17/20*    (2006.01)
(52) U.S. Cl. ............................................. 415/1; 415/914
(58) Field of Classification Search ............... 415/1, 914
    See application file for complete search history.

(56) References Cited

U.S. PATENT DOCUMENTS

| | | | |
|---|---|---|---|
| 2,594,042 A | 4/1952 | Lee | |
| 3,300,121 A | 1/1967 | Johnson | |
| 5,161,944 A | 11/1992 | Wood | |
| 6,438,484 B1 | 8/2002 | Andrew et al. | |
| 6,607,350 B2 * | 8/2003 | Dodd | 415/14 |
| 6,666,017 B2 | 12/2003 | Prentice et al. | |
| 6,715,984 B2 * | 4/2004 | Nakajima et al. | 415/1 |
| 6,793,455 B2 | 9/2004 | Prasad et al. | |
| 6,871,487 B2 | 3/2005 | Kurtz et al. | |
| 6,973,771 B2 | 12/2005 | Nottin | |
| 7,159,401 B1 | 1/2007 | Kurtz et al. | |
| 7,334,394 B2 | 2/2008 | Samimy et al. | |
| 7,588,413 B2 | 9/2009 | Lee et al. | |
| 7,628,585 B2 | 12/2009 | Lee et al. | |
| 7,695,241 B2 | 4/2010 | Lee et al. | |
| 7,736,123 B2 * | 6/2010 | Lee et al. | 415/1 |
| 7,766,599 B2 | 8/2010 | Lee et al. | |
| 7,819,626 B2 | 10/2010 | Lee et al. | |
| 7,870,720 B2 | 1/2011 | Hagseth et al. | |
| 7,871,719 B2 | 1/2011 | Houchin-Miller et al. | |

(Continued)

FOREIGN PATENT DOCUMENTS

DE    102006008864    2/2006

(Continued)

OTHER PUBLICATIONS

"Overview of Plasma Flow Control: Concepts, Optimization, and Applications", thomas C. Corke and Martiqua L. Post, 43rd AIAA Aerospace Science Meeting and Exhibit, Jan. 10-13, 2005, Reno, Nevada, AIAA 2005-563, 15 pages.

(Continued)

*Primary Examiner* — Dwayne J White
(74) *Attorney, Agent, or Firm* — General Electric Company; Matthew P. Hayden; David J. Clement (57) ABSTRACT

An instability mitigation system is disclosed, comprising a rotor having a row of blades arranged around a centerline axis, and a mitigation system comprising at least one plasma actuator mounted on a blade that facilitates the improvement of the stability of the rotor, and a control system for controlling the operation of the mitigation system. An instability mitigation system further comprising a detection system for detecting an onset of an instability in a rotor and a control system for controlling the detection system and the mitigation system are disclosed.

19 Claims, 9 Drawing Sheets

U.S. PATENT DOCUMENTS

| | | | |
|---|---|---|---|
| 7,984,614 | B2 | 7/2011 | Nolcheff |
| 8,006,497 | B2 | 8/2011 | Nolcheff et al. |
| 2004/0011917 | A1 | 1/2004 | Saeks et al. |
| 2008/0089775 | A1 | 4/2008 | Lee et al. |
| 2008/0101913 | A1 | 5/2008 | Lee et al. |
| 2008/0128266 | A1 | 6/2008 | Lee et al. |
| 2008/0131265 | A1 | 6/2008 | Lee et al. |
| 2008/0145210 | A1 | 6/2008 | Lee et al. |
| 2008/0145233 | A1 | 6/2008 | Lee et al. |
| 2009/0065064 | A1* | 3/2009 | Morris et al. ............ 137/2 |
| 2009/0169356 | A1 | 7/2009 | Wadia et al. |
| 2009/0169362 | A1 | 7/2009 | Wadia et al. |
| 2009/0169363 | A1 | 7/2009 | Wadia et al. |
| 2009/0169367 | A1 | 7/2009 | Wadia et al. |
| 2010/0047060 | A1 | 2/2010 | Wadia et al. |
| 2010/0170224 | A1 | 7/2010 | Clark et al. |
| 2010/0172747 | A1 | 7/2010 | Clark et al. |
| 2010/0284780 | A1 | 11/2010 | Wadia et al. |
| 2010/0284785 | A1 | 11/2010 | Wadia et al. |
| 2010/0284795 | A1 | 11/2010 | Wadia et al. |

FOREIGN PATENT DOCUMENTS

| | | |
|---|---|---|
| EP | 1329595 | 7/2003 |
| EP | 1413713 | 4/2004 |
| EP | 1607574 | 12/2005 |
| EP | 1672966 | 6/2006 |
| EP | 1906136 | 4/2008 |
| EP | 1908927 | 4/2008 |
| EP | 1914385 | 4/2008 |
| EP | 1914391 | 4/2008 |
| EP | 1918520 | 5/2008 |
| EP | 1926353 | 5/2008 |
| EP | 1936116 | 6/2008 |
| EP | 1936117 | 6/2008 |
| FR | 1031925 | 6/1953 |
| GB | 2191606 | 4/1987 |
| JP | 2008-270110 | 6/2008 |
| WO | 1994003862 | 2/1994 |
| WO | 1999035893 | 7/1999 |
| WO | 2003038282 | 5/2003 |
| WO | 2005114013 | 12/2005 |
| WO | 2008154592 | 12/2008 |
| WO | 2009018532 | 2/2009 |

OTHER PUBLICATIONS

"Plasma Control of Boundary Layer Using Low-Temperature Non-Equilibrium Plasma of Gas Discharge", D.F. Opaits, D.V. Roupassov, S. M. Starikovskaia, A.Yu. Starikovskii, I.N. Zavialov, and S.G. Saddoughi, 43rd AIAA Aerospace Sciences Meeting and Exhibit, Jan. 10-13, 2005, Reno, Nevada, AIAA 2005-1180, 6 pages.
"Demonstration of Separation Delay With Glow-Discharge Plasma Actuators", Lennart S. Hultgren and David E. Ashpis, 41st AIAA Aerospace Sciences Meeting and Exhibit, Jan. 6-9, 2003, Reno, Nevada, AIAA 2003-1025, 10 pages.
Unsteady Plasma Actuators for Separation Control of Low-Pressure Turbine Blades:, Junhui Huang, Thomas C. Corke and Flint O. Thomas, AIAA Journal, vol. 44, No. 7, Jul. 2006, pp. 1477-1487.
"Control of Separation in Turbine Boundary Layers", R.B. Rivir, R. Sondergaard, J.P. Bons, and N. Yurchenko, 2nd AIAA Flow Control Conference, Jun. 28-Jul. 1, 2004, Portland, Oregon, 16 pages.
"Plasma Flow Control Optimized Airfoil", Thomas C. Corke, Benjamin Mertz, and Mehul P. Patel, 44th AIAA Aerospace Sciences Meeting and Exhibit, Jan. 9-12, 2006, Reno, Nevada, AIAA 2006-1208, 13 pages.
"Control of Transitional and Turbulent Flows Using Plasma-Based Actuators", Miguel R. Visbal, Datta V. Gaitonde, and Subrata Roy, 36th AIAA Fluid Dynamics Conference and Exhibit, Jun. 5-8, 2006, San Francisco California, AIAA 2006-3230, 22 pages.
"AC and Pulsed Plasma Flow Control", R. Rivir, A. White, C. Carter, B. Ganguly, J. Jacob, A. Forelines, and J. Crafton, 42nd AIAA Aerospace Sciences Meeting and Exhibit, Jan. 5-8, 2004, Reno, Nevada, AIAA 2004-847, 9 pages.
"Effects of Plasma Induced Velocity on Boundary Layer Flow" Brian E. Balcer, Milton E. Franke, and Richard B. Rivir, 44th AIAA Aerospace Sciences Meeting and Exhibit, Jan. 9-12, 2006, Reno, Nevada, AIAA 2006-875, 12 pages.
"Flow Control Using Plasma Actuators and Linear/Annular Plasma Synthetic Jet Actuators", Arvind Santhanakrishan, Jamey D. Jacov, and Yildirim B. Suzen, 3rd AIAA Flow Control Conference, Jun. 5-8, 2006, San Francisco, California, AIAA 2006-3033, 31 pages.
"Turbulent Drag Reduction by Surface Plasma through Spanwise Flow Oscillation", Timothy N. Jukes, Kwing-So Choi, Graham A. Johnson, and Simon J. Scott, 3rd AIAA Flow Control Conference, Jun. 5-8, 2006, San Francisco, California, AIAA 2006-3693, 14 pages.
D. Christensen, P. Cantin, D. Gutz, P.N.Szucs, A.R.Wadia, J. Armor, M.Dhingra, Y.Neumeier and J.V.R.Prasad; "Development and Demonstration of a Stability Management System for Gas Turbine Engines", Proceedings of GT 2006 ASME Turbo Expo 2006, May 8-11, 2006, Barcelona, Spain, GT2006-90324.
Corke, Thomas C., et al., "Overview of Plasma Flow Control: Concepts, Optimization, and Applications", 43rd AIAA Aerospace Science Meeting and Exhibit, Jan. 10-13, 2005, Reno, Nevada, AIAA 2005-563, American Institute of Aeronautics and Astronauts, Inc.
Opaits, D.F., et al., "Plasma Control of Boundary Layer Using Low-Temperature Non-Equilibrium Plasma of Gas Discharge", 43rd AIAA Aerospace Science Meeting and Exhibit, Jan. 10-13, 2005, Reno, Nevada, AIAA 2005-1180, American Institute of Aeronautics and Astronauts, Inc.
Hultgren, Lennart S., et al., "Demonstration of Separation Delay With Glow-Discharge Plasma Actuators", 41st AIAA Aerospace Science Meeting and Exhibit, Jan. 6-9, 2003, Reno, Nevada, AIAA 2003-1025, American Institute of Aeronautics and Astronauts, Inc.
Huang, Junhui, et al, "Unsteady Plasma Actuators for Separation Control of Low-Pressure Turbine Blades", AIAA Journal, vol. 44, No. 7, Jul. 2006, pp. 1147-1157, American Institute of Aeronautics and Astronauts, Inc.
Rivir, R.B., et al., "Control of Separation in Turbine Boundary Layers", 2nd AIAA Flow Control Conference, Jun. 28-Jul. 1, 2004, Portland, Oregon, AIAA 2004-2201, American Institute of Aeronautics and Astronauts, Inc.
Corke, Thomas C., et al., "Plasma Flow Control Optimized Airfoil", 44th AIAA Aerospace Sciences Meeting and Exhibit, Jan. 9-12, 2006, Reno, Nevada, AIAA 2006-1208, American Institute of Aeronautics and Astronauts, Inc.
Visbal, Miguel R., et al., "Control of Transitional and Turbulent Flows Using Plasma-Based Actuators", 36th AIAA Fluid Dynamics Conference and Exhibit, Jun. 5-8, 2006, San Francisco, California, AIAA 2006-3230, American Institute of Aeronautics and Astronauts, Inc.
Rivir, R., et al., "AC and Pulsed Plasma Flow Control", 42nd AIAA Aerospace Sciences Meeting and Exhibit, Jan. 5-8, 2004, Reno, Nevada, AIAA 2004-847, American Institute of Aeronautics and Astronauts, Inc.
Balcer, Brian E., et al., "Effects of Plasma Induced Velocity on Boundary Layer Flow", 44th AIAA Aerospace Sciences Meeting and Exhibit, Jan. 9-12, 2006, Reno, Nevada, AIAA 2006-875, American Institute of Aeronautics and Astronauts, Inc.
Santhanakrishnan, Arvind, et al., "Flow Control Using Plasma Actuators and Linear/Annular Plasma Synthetic Jet Actuators", 3rd AIAA Flow Control Conference, Jun. 5-8, 2006, San Francisco, California, AIAA 2006-3033, American Institute of Aeronautics and Astronauts, Inc.
Jukes, Timothy N., et al., "Turbulent Drag Reduction by Surface Plasma through Spanwise Flow Oscillation", 3rd AIAA Flow Control Conference, Jun. 5-8, 2006, San Francisco, California, AIAA 2006-3693, American Institute of Aeronautics and Astronauts, Inc.
Christensen, D. et al., "Development and Demonstration of a Stability Management System for Gas Turbine Engines," Proceedings of GT2006, ASME Turbo Expo 2006: Power for Land, Sea and Air, Barcelona, Spain, GT2006-90324, (May 8-11, 2006).
Wikipedia Contributors: "Dielectric barrier discharge"; Internet Citation, [online] p. 1, XP007907353; retrieved from the Internet: URL:http://en.wikipedia.org/w/index.php?title=Dielectric_barrier_discharge&oldid=255196896>[retrieved on Jan. 1, 2009].
Wikipedia Contributors: "Plasma (physics)"; Internet Citation, [online] pp. 1-16, XP007907356; retrieved from the Internet:

URL:http://en.wikipedia.org/w/index.php?title=Plasma_physics &oldid=2729329>[retrieved on Feb. 24, 2009].

Goksel, B. et al, "Active Flow Control, in Turbomachinery Using Phased Plasma Actuators", Internet Citation, [online] Apr. 1, 2004; XP007907306; retrieved from the Internet: URL:http://www.electrofluidsystems.com/news/goksel-ISABE2005.pdf>[retrieved on Feb. 19, 2009].

Patel, M.P. et al., "Autonomous Sensing and Control of Wing Stall Using a Smart Plasma Slat"; Journal of Aircraft; vol. 44, No. 2, Mar.-Apr. 2007.

Vo, H.D., "Control of Rotating Stall in Axial Compressors Using Plasma Actuators"; Ecole Polytechnique de Montreal, Montreal, Canada; AIAA 2007-3845; pp. 1-15.

Wu, Y. et al., "Experimental investigation of using plasma aerodynamic actuation to extend low-speed axial compressor's stability"; Hangkong-Dongli-Xuebao:Jikan=Journal of Aerospace Power, Beijing Hangkong Xueyuan Chubanshe, Beijing, vol. 22, No. 12, Dec. 1, 2007, pp. 2025-2030, XP009112656; ISSN: 100-8055.

Corke, T.C., et al., "SDBD plasma enhanced aerodynamics: concepts, optimization and applications"; Progress in Aerospace Sciences 43 (2007); pp. 193-217; Hessert Laboratory for Aerospace Research, Center for Flow Physics and Control, University of Notre Dame, Notre Dame, IN 46556, USA.

Van Ness II, D.K. et al., "Stereo PIV of a Turbine Tip Clearance Flow with Plasma Actuation", AIAA paper 2006-21, Jan. 1, 2006, pp. 1-11, XP009112404.

Vo, H.D., "Suppression of Short Length-Scale Rotating Stall Inception With Glow Discharge Actuation"; ASME Turbo Expo 2007; Power for Land, Sea and Air; May 14-17, 2007, Montreal, Canada; Ecole Polytechnique de Montreal Department of Mechanical Engineering; Montreal, Quebec, Canada; pp. 267-278; Copyright 2007 by ASME.

Morris, S.C., et al.; "Tip Clearance Control Using Plasma Actuators"; 43rd AIAA Aerospace Sciences Meeting and Exhibit, Jan. 10-13, 2005, Reno, Nevada; AIAA 2005-782; pp. 1-8.

Douville, T. et al., "Turbine Blade Tip Leakage Flow Control by Partial Squealer Tip and Plasma Actuators"; AIAA Aerospace Sciences Meeting, vol. AIAA 2006-20; Jan. 1, 2006; pp. 263-280.

Van Ness II, D.K. et al., "Turbine Tip Clearance Flow Control using Plasma Actuation", AIAA paper 2006-21, Jan. 1, 2006, pp. 1-11, XP009112404.

International Search Report mailed Apr. 3, 2009 for corresponding Application No. PCT/US2008/088112.

Written Opinion mailed Apr. 3, 2009 for corresponding Application No. PCT/US2008/088112.

International Search Report mailed Jun. 8, 2009 for corresponding Application No. PCT/US2008/088116.

Written Opinion mailed Jun. 8, 2009 for corresponding Application No. PCT/US2008/088116.

* cited by examiner

INSTABILITY MITIGATION SYSTEM USING ROTOR PLASMA ACTUATORS

BACKGROUND OF THE INVENTION

This invention relates generally to gas turbine engines, and, more specifically, to a system for detection of an instability such as a stall in a compression system such as a fan or a compressor used in a gas turbine engine.

In a turbofan aircraft gas turbine engine, air is pressurized in a compression system, comprising a fan module, a booster module and a compression module during operation. In large turbo fan engines, the air passing through the fan module is mostly passed into a by-pass stream and used for generating the bulk of the thrust needed for propelling an aircraft in flight. The air channeled through the booster module and compression module is mixed with fuel in a combustor and ignited, generating hot combustion gases which flow through turbine stages that extract energy therefrom for powering the fan, booster and compressor rotors. The fan, booster and compressor modules have a series of rotor stages and stator stages. The fan and booster rotors are typically driven by a low pressure turbine and the compressor rotor is driven by a high pressure turbine. The fan and booster rotors are aerodynamically coupled to the compressor rotor although these normally operate at different mechanical speeds.

Operability in a wide range of operating conditions is a fundamental requirement in the design of compression systems, such as fans, boosters and compressors. Modern developments in advanced aircrafts have required the use of engines buried within the airframe, with air flowing into the engines through inlets that have unique geometries that cause severe distortions in the inlet airflow. Some of these engines may also have a fixed area exhaust nozzle, which limits the operability of these engines. Fundamental in the design of these compression systems is efficiency in compressing the air with sufficient stall margin over the entire flight envelope of operation from takeoff, cruise, and landing. However, compression efficiency and stall margin are normally inversely related with increasing efficiency typically corresponding with a decrease in stall margin. The conflicting requirements of stall margin and efficiency are particularly demanding in high performance jet engines that operate under challenging operating conditions such as severe inlet distortions, fixed area nozzles and increased auxiliary power extractions, while still requiring high a level of stability margin throughout the flight envelope.

Instabilities, such as stalls, are commonly caused by flow breakdowns on the airfoils of the rotor blades and stator vanes of compression systems such as fans, compressors and boosters. In gas turbine engine compression system rotors, there are tip clearances between rotating blade tips and a stationary casing or shroud that surrounds the blade tips. During the engine operation, air leaks from the pressure side of a blade through the tip clearance toward the suction side. These leakage flows may cause vortices to form at the tip region of the blade. A tip vortex can grow and spread in the spanwise and chordwise directions on the rotor blades and stator vanes. Flow separations on the stator and rotor airfoils may occur when there are severe inlet distortions in the air flowing into compression system, or when the engine is throttled, and lead to a compressor stall and cause significant operability problems and performance losses.

Accordingly, it would be desirable to have the ability to measure and control dynamic processes such as flow instabilities in compression systems. It would be desirable to have a detection system that can measure a compression system parameter related to the onset of flow instabilities, such as the dynamic pressure near the blade tips or other locations, and process the measured data to detect the onset of an instability such as a stall in compression systems, such as fans, boosters and compressors. It would be desirable to have a mitigation system to mitigate compression system instabilities based on the detection system output, for certain flight maneuvers at critical points in the flight envelope, allowing the maneuvers to be completed without instabilities such as stalls and surges. It would be desirable to have an instability mitigation system that can control and manage the detection system and the mitigation system.

BRIEF DESCRIPTION OF THE INVENTION

The above-mentioned need or needs may be met by exemplary embodiments which provide an instability mitigation system comprising a mitigation system having a detection system for detecting an instability in a rotor, at least one plasma actuator mounted on a rotor blade that facilitates the improvement of the stability of the rotor and a control system for controlling the operation of the detection system and the mitigation system.

In one exemplary embodiment, a gas turbine engine comprising a fan section, a detection system for detecting an instability during the operation of the fan section and a mitigation system that facilitates the improvement of the stability of the fan section is disclosed.

In another exemplary embodiment, a detection system is disclosed for detecting onset of an instability in a multi-stage compression system rotor comprising a pressure sensor located on a casing surrounding tips of a row of rotor blades wherein the pressure sensor is capable of generating an input signal corresponding to the dynamic pressure at a location near the rotor blade tip.

In another exemplary embodiment, a mitigation system is provided to mitigate compression system instabilities for increasing the stable operating range of a compression system, the system comprising at least one plasma generator located on a rotor stage of the compression system. The plasma generator comprises a first electrode and a second electrode separated by a dielectric material. The plasma generator is operable for forming a plasma between first electrode and the second electrode.

In another exemplary embodiment, the plasma actuator is mounted on the rotor airfoil in a generally spanwise direction. In another exemplary embodiment the plasma actuator system comprises a plasma actuator mounted on a movable flap of an inlet guide vane.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
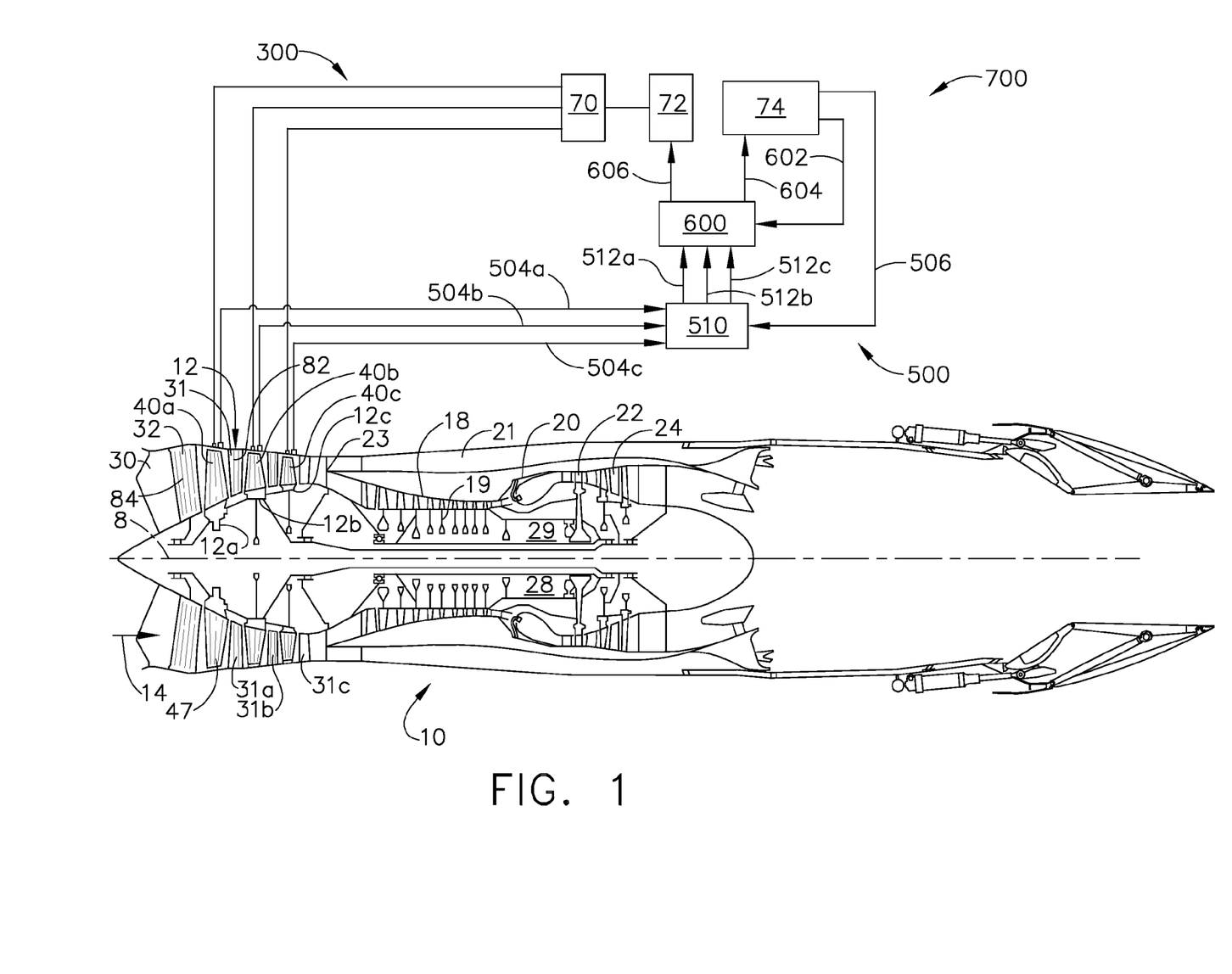
FIG. 1 is a schematic cross-sectional view of a gas turbine engine with an exemplary embodiment of the present invention.
Figure 2:
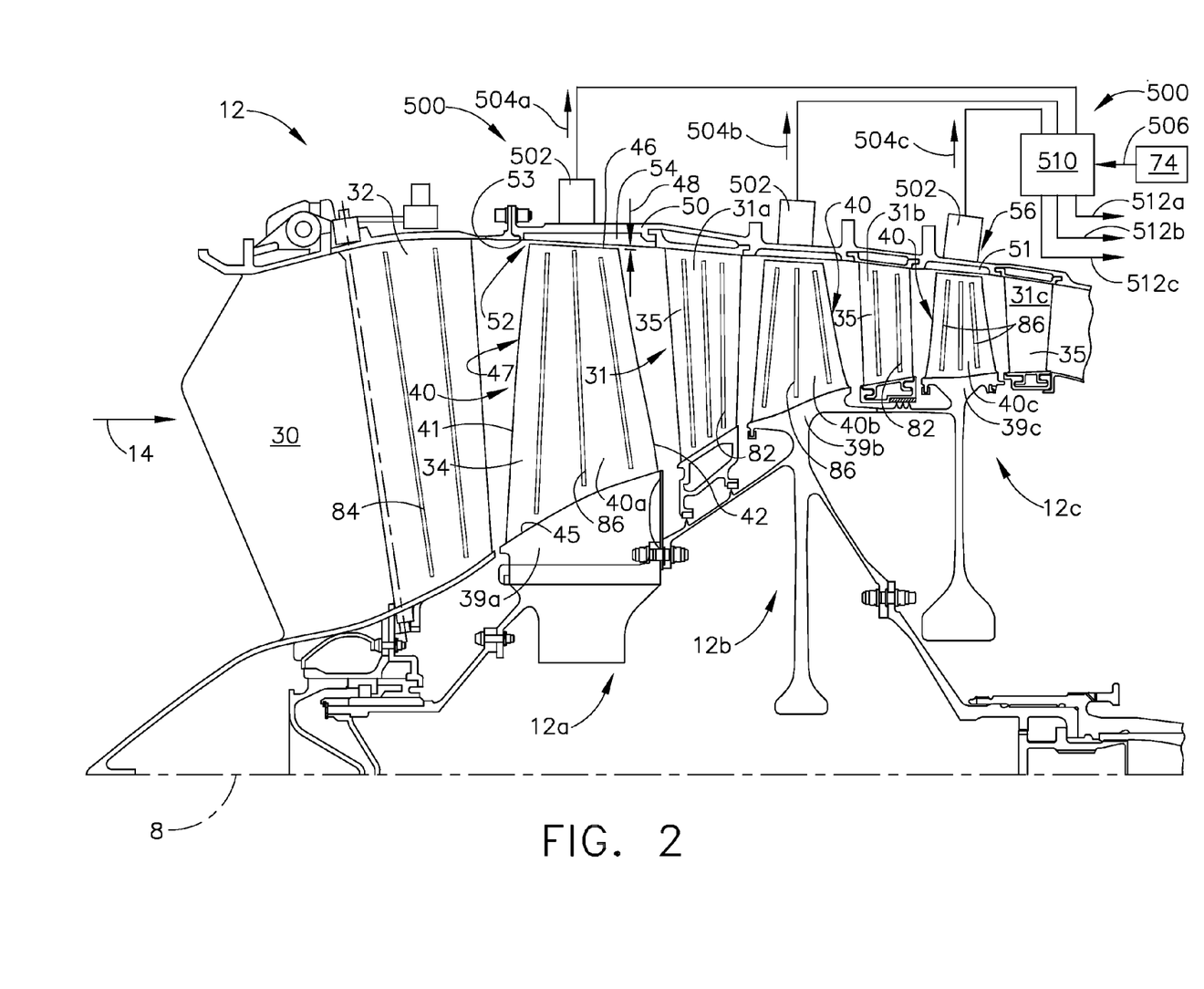
FIG. 2 is an enlarged cross-sectional view of a portion of the fan section of the gas turbine engine shown in FIG. 1, showing an exemplary embodiment of plasma actuators mounted on rotor and stator airfoils.

Referring to the drawings wherein identical reference numerals denote the same elements throughout the various views, FIG. 1 shows an exemplary turbofan gas turbine engine 10 incorporating an exemplary embodiment of the present invention. It comprises an engine centerline axis 8, fan section 12 which receives ambient air 14, a high pressure compressor (HPC) 18, a combustor 20 which mixes fuel with the air pressurized by the HPC 18 for generating combustion gases or gas flow which flows downstream through a high pressure turbine (HPT) 22, and a low pressure turbine (LPT) 24 from which the combustion gases are discharged from the engine 10. Many engines have a booster or low pressure compressor (not shown in FIG. 1) mounted between the fan section and the HPC. A portion of the air passing through the fan section 12 is bypassed around the high pressure compressor 18 through a bypass duct 21 having an entrance or splitter 23 between the fan section 12 and the high pressure compressor 18. The HPT 22 is joined to the HPC 18 to substantially form a high pressure rotor 29. A low pressure shaft 28 joins the LPT 24 to the fan section 12 and the booster if one is used. The second or low pressure shaft 28 is rotatably disposed co-axially with and radially inwardly of the first or high pressure rotor. In the exemplary embodiments of the present invention shown in FIGS. 1 and 2, the fan section 12 has a multi-stage fan rotor, as in many gas turbine engines, illustrated by first, second, and third fan rotor stages 12a, 12b, and 12c respectively, and a plurality of stator stages 31, each stator stage having a circumferential row of stator vanes such as 31a, 31b and 31c. Each stator stage is located in axial fwd or aft from a rotor such as 12a. For example, as shown in FIG. 2, the stator stage having a circumferential row of stator vanes 31a is located axially aft from the rotor 12a. It is common to have a circumferential row of Inlet guide vanes (IGV) at the inlet to the compression system, as shown in FIG. 2. The IGV's may have movable flaps 32, located on its aft end, as shown in FIG. 2.

The fan section 12 that pressurizes the air flowing through it is axisymmetrical about the longitudinal centerline axis 8. The fan section 12 shown in FIG. 2 includes a plurality of inlet guide vanes (IGV) 30 and a plurality of stator vanes 31a, 31b, 31c arranged in a circumferential direction around the longitudinal centerline axis 8. The multiple rotor stages 12a, 12b, 12c of the fan section 12 have corresponding fan rotor blades 40a, 40b, 40c extending radially outwardly from corresponding rotor hubs 39a, 39b, 39c in the form of separate disks, or integral blisks, or annular drums in any conventional manner.

Cooperating with a fan rotor stage 12a, 12b, 12c shown in FIG. 2 is a corresponding stator stage 31 comprising a plurality of circumferentially spaced apart stator vanes 31a, 31b, 31c. An exemplary arrangement of stator vanes and rotor blades is shown in FIG. 2. The rotor blades 40 and stator vanes 31a, 31b, 31c have airfoils having corresponding aerodynamic profiles or contours for pressurizing the airflow successively in axial stages. Each fan rotor blade 40 comprises an airfoil 34 extending radially outward from a blade root 45 to a blade tip 46, a concave side (also referred to as "pressure side") 43, a convex side (also referred to as "suction side") 44, a leading edge 41 and a trailing edge 42. The blade airfoil 34 extends in the chordwise direction between the leading edge 41 and the trailing edge 42. A chord C of the airfoil 34 is the length between the leading 41 and trailing edge 42 at each radial cross section of the blade. The pressure side 43 of the airfoil 34 faces in the general direction of rotation of the fan rotors and the suction side 44 is on the other side of the airfoil.

A stator stage 31 is located in axial proximity to a rotor, such as for example item 12b. Each stator vane, such as shown as items 31a, 31b, 31c in FIG. 2, in a in a stator stage 31 comprises an airfoil 35 extending radially in a generally spanwise direction corresponding to the span between the blade root 45 and the blade tip 46. Each stator vane, such as item 31a, has a vane concave side (also referred to as "pressure side") 57, a vane convex side (also referred to as "suction side") 58, a vane leading edge 36 and a vane trailing edge 37. The vane airfoil 35 extends in the chordwise direction between the leading edge 36 and the trailing edge 37. A chord of the airfoil 35 is the length between the leading 36 and trailing edge 37 at each radial cross section of the stator vane. At the front of the compression system, such as the fan section 12, is a stator stage having a set if inlet guide vanes 30 ("IGV") that receive the airflow into the compression system. The inlet guide vanes 30 have a suitably shaped aerodynamic profile to guide the airflow into the first stage rotor 12a. In order to suitably orient the airflow into the compression system, the inlet guide vanes 30 may have IGV flaps 32 that are moveable, located near their aft end. The IGV flap 32 is shown in FIG. 2 at the aft end of the IGV 30. It is supported between two hinges at the radially inner end and the outer end such that it is can be moved during the operation of the compression system.

The rotor blades rotate within a static structure, such as a casing or a shroud, that are located radially apart from and surrounding the blade tips, as shown in FIG. 2. The front stage rotor blades 40 rotate within an annular casing 50 that surrounds the rotor blade tips. The aft stage rotor blades of a multi stage compression system, such as the high pressure compressor shown as item 18 in FIG. 1, typically rotate within an annular passage formed by shroud segments 51 that are circumferentially arranged around the blade tips 46. In operation, pressure of the air is increased as the air decelerates and diffuses through the stator and rotor airfoils.

Figure 3:
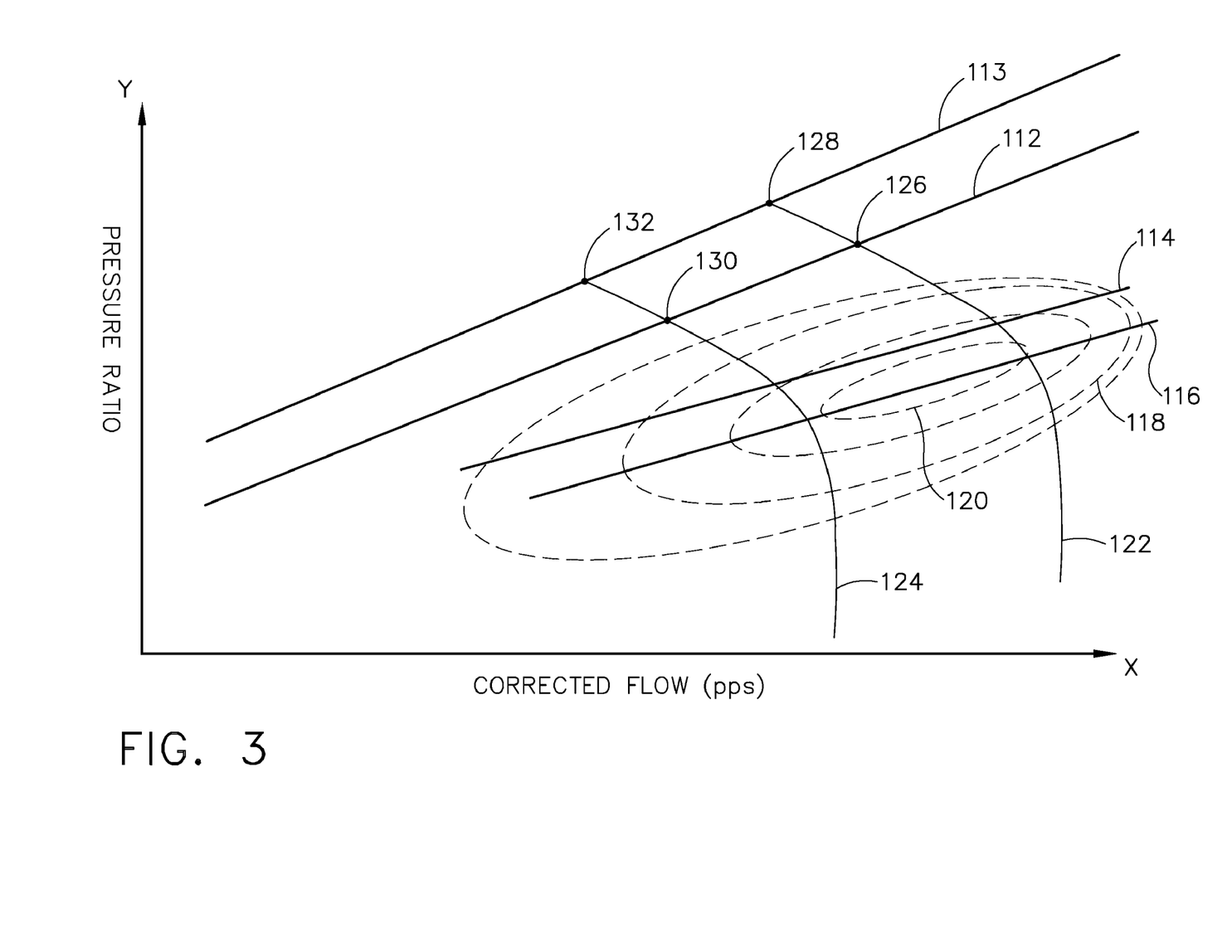
FIG. 3 is an exemplary operating map of a compression system in the gas turbine engine shown in FIG. 1.

Operating map of an exemplary compression system, such as the fan section 12 in the exemplary gas turbine engine 10 is shown in FIG. 3, with inlet corrected flow rate along the horizontal axis and the pressure ratio on the vertical axis. Exemplary operating lines 114, 116 and the stall line 112 are shown, along with exemplary constant speed lines 122, 124. Line 124 represents a lower speed line and line 122 represents a higher speed line. As the compression system is throttled at a constant speed, such as constant speed line 124, the inlet corrected flow rate decreases while the pressure ratio increases, and the compression system operation moves closer to the stall line 112. Each operating condition has a corresponding compression system efficiency, conventionally defined as the ratio of ideal (isentropic) compressor work input to actual work input required to achieve a given pressure ratio. The compressor efficiency of each operating condition is plotted on the operating map in the form of contours of constant efficiency, such as items 118, 120 shown in FIG. 3. The performance map has a region of peak efficiency, depicted in FIG. 3 as the smallest contour 120, and it is desirable to operate the compression systems in the region of peak efficiency as much as possible. Flow distortions in the inlet air flow 14 which enters the fan section 12 tend to cause flow instabilities as the air is compressed by the fan blades (and compression system blades) and the stall line 112 will tend to drop lower. As explained further below herein, the exemplary embodiments of the present invention provide a system for detecting the flow instabilities in the fan section 12, such as from flow distortions, and processing the information from the fan section to predict an impending stall in a fan rotor. The embodiments of the present invention shown herein enable other systems in the engine which can respond as necessary to manage the stall margin of fan rotors and other compression systems by raising the stall line, as represented by item 113 in FIG. 3.

Stalls in fan rotors due to inlet flow distortions, and stalls in other compression systems that are throttled, are known to be caused by a breakdown of flow or flow separation in the stator and rotor airfoils, especially near the tip region 52 of rotors, such as the fan rotors 12*a*, 12*b*, 12*c* shown in FIG. 2. Flow breakdown near blade tips is associated with tip leakage vortex that has negative axial velocity, that is, the flow in this region is counter to the main body of flow and is highly undesirable. Unless interrupted, the tip vortex propagates axially aft and tangentially from the blade suction surface 44 to the adjacent blade pressure surface 43. As the inlet flow distortions become severe, or as a compression system is throttled, the blockage becomes increasingly larger within the flow passage between the adjacent blades and vanes and eventually becomes so large as to drop the rotor pressure ratio below its design level, and causes the compression system to stall.

The ability to control a dynamic process, such as a flow instability in a compression system, requires a measurement of a characteristic of the process using a continuous measurement method or using samples of sufficient number of discrete measurements. In order to mitigate fan stalls for certain flight maneuvers at critical points in the flight envelope where the stability margin is small or negative, a flow parameter in the engine is first measured that can be used directly or, with some additional processing, to predict the onset of stall of a stage of a multistage fan shown in FIG. 2.

Figure 4:
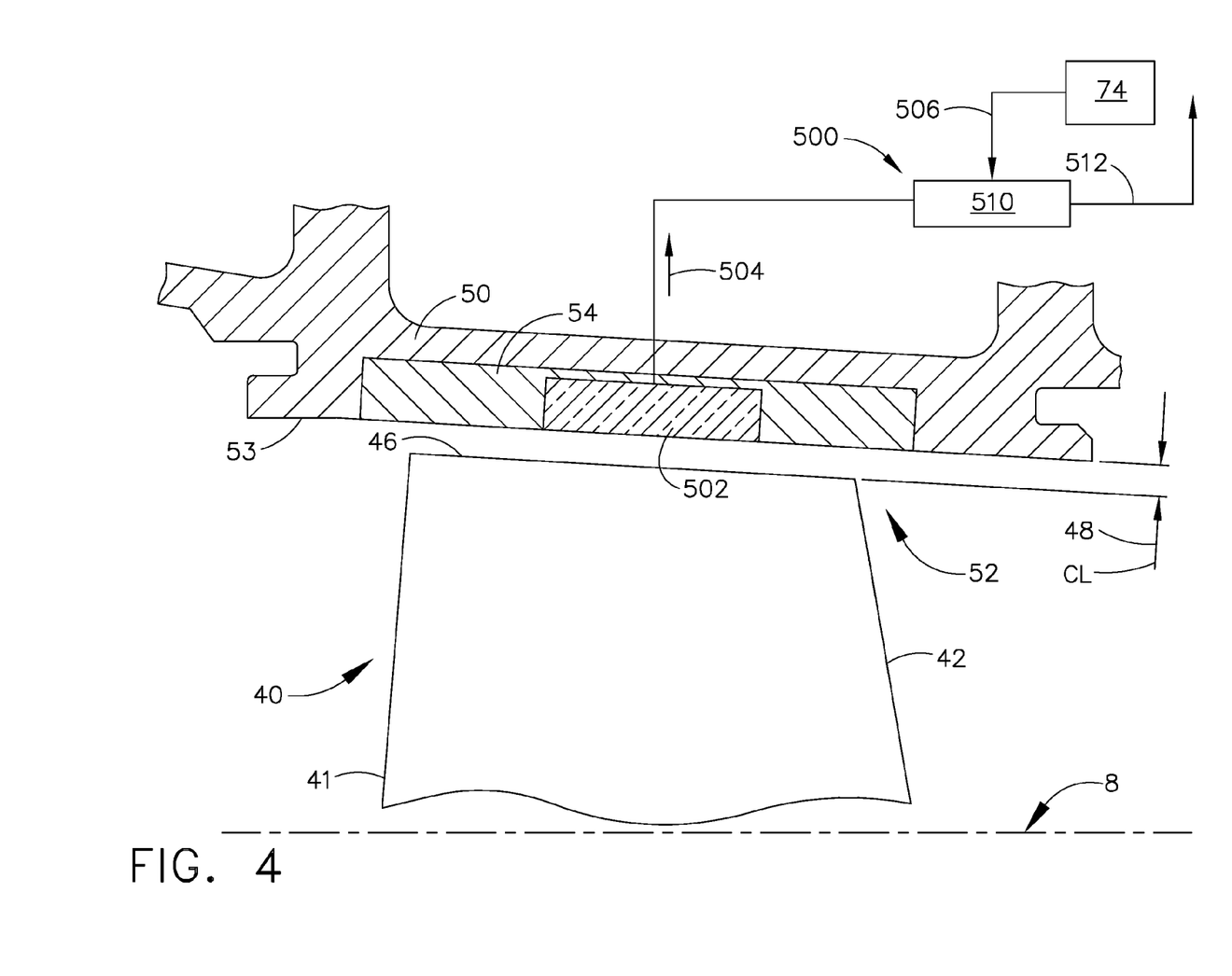
FIG. 4 is a schematic cross sectional view of an exemplary embodiment of the present invention showing an exemplary detection system mounted on a static component.

FIG. 4 shows an exemplary embodiment of a system 500 for detecting the onset of an aerodynamic instability, such as a stall or surge, in a compression stage in a gas turbine engine 10. In the exemplary embodiment shown in FIG. 2, a fan section 12 is shown, comprising a three stage fan having rotors, 12*a*, 12*b* and 12*c* and stator stages having stator vanes 31*a*, 31*b*, 31*c*, and IGVs 30. The embodiments of the present invention can also be used in a single stage fan, or in other compression systems in a gas turbine engine, such as a high pressure compressor 18 or a low pressure compressor or a booster. In the exemplary embodiments shown herein, a pressure sensor 502 is used to measure the local dynamic pressure near the tip region 52 of the fan blade tips 46 during engine operation. Although a single sensor 502 can be used for the flow parameter measurements, use of at least two sensors 502 is preferred, because some sensors may become inoperable during extended periods of engine operations. In the exemplary embodiment shown in FIG. 2, multiple pressure sensors 502 are used around the tips of fan rotors 12*a*, 12*b*, and 12*c*.

Figure 9:
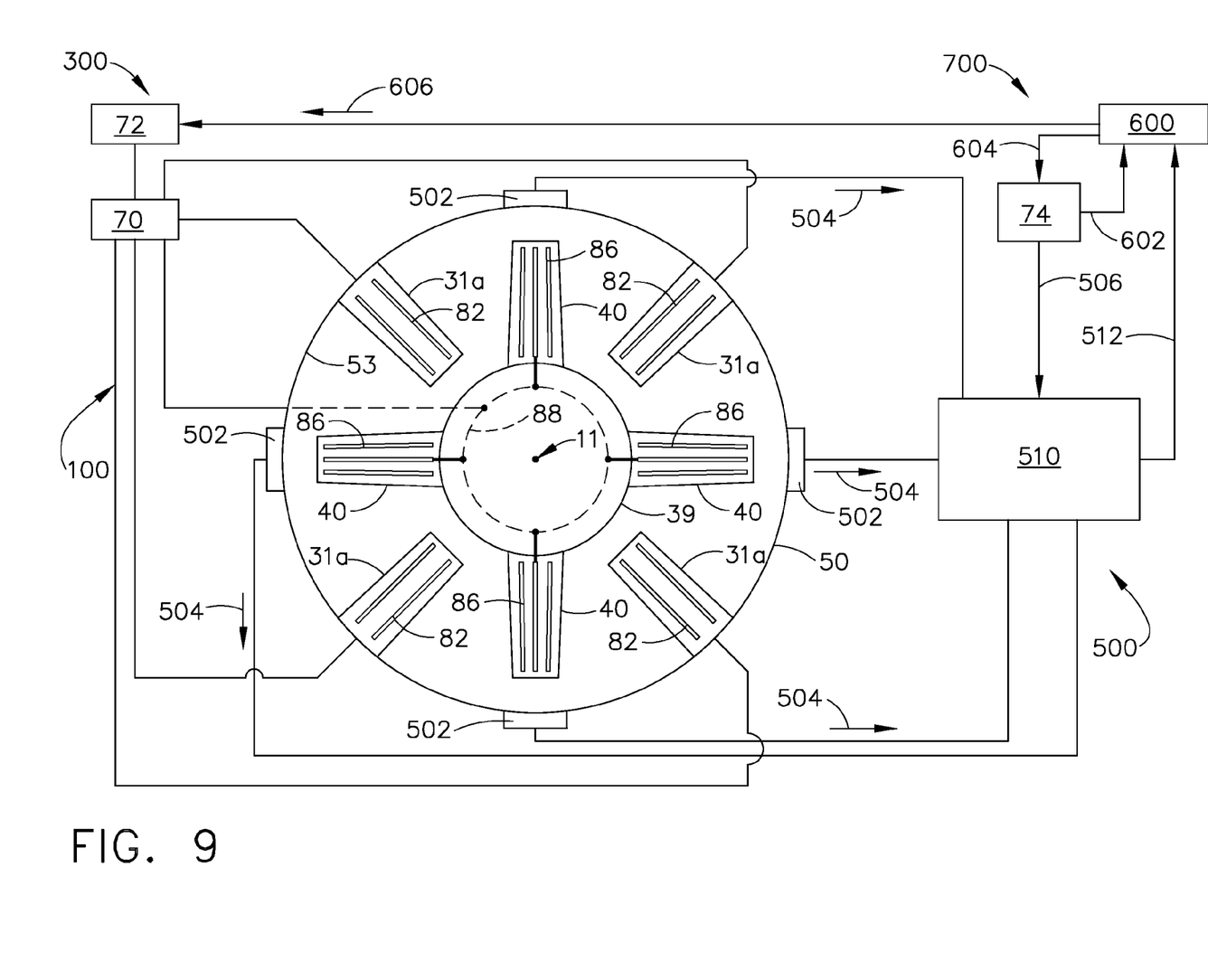
FIG. 9 is a schematic sketch of an exemplary embodiment of an instability mitigation system showing an exemplary arrangement of multiple sensors mounted on a casing and plasma actuators mounted on a rotor stage and a stator stage.

In the exemplary embodiment shown in FIG. 4, the pressure sensor 502 is located on a casing 50 that is spaced radially outwardly and apart from the fan blade tips 46. Alternatively, the pressure sensor 502 may be located on a shroud 51 that is located radially outwardly and apart from the blade tips 46. The casing 50, or a plurality of shrouds 51, surrounds the tips of a row of blades 47. The pressure sensors 502 are arranged circumferentially on the casing 50 or the shrouds 51, as shown in FIG. 9. In an exemplary embodiment using multiple sensors on a rotor stage, the sensors 502 are arranged in substantially diametrically opposite locations in the casing or shroud, as shown in FIG. 9. Alternatively, in other embodiments of the present invention, sensors 502 may be mounted in locations in a stator stage 31 to measure flow parameters in the stator. Suitable sensors may also be mounted on the stator airfoil convex side 58 or concave side 57 or the rotor blade 40.

During engine operation, there is an effective clearance CL between the fan blade tip and the casing 50 or the shroud 51 (see FIG. 4). The sensor 502 is capable of generating an input signal 504 in real time corresponding to a flow parameter, such as the dynamic pressure in the blade tip region 52 near the blade tip 46. A suitable high response transducer, having a response capability higher than the blade passing frequency is used. Typically these transducers have a response capability higher than 1000 Hz. In the exemplary embodiments shown herein the sensors 502 used were made by Kulite Semiconductor Products. The transducers have a diameter of about 0.1 inches and are about 0.375 inches long. They have an output voltage of about 0.1 volts for a pressure of about 50 pounds per square inch. Conventional signal conditioners are used to amplify the signal to about 10 volts. It is preferable to use a high frequency sampling of the dynamic pressure measurement, such as for example, approximately ten times the blade passing frequency.

The flow parameter measurement from the sensor 502 generates a signal that is used as an input signal 504 by a correlation processor 510. The correlation processor 510 also receives as input a fan rotor speed signal 506 corresponding to the rotational speeds of the fan rotors 12*a*, 12*b*, 12*c*, as shown in FIGS. 1, 4 and 9. In the exemplary embodiments shown herein, the fan rotor speed signal 506 is supplied by an engine control system 74, that is used in gas turbine engines. Alternatively, the fan rotor speed signal 506 may be supplied by a digital electronic control system or a Full Authority Digital Electronic Control (FADEC) system used an aircraft engine.

The correlation processor 510 receives the input signal 504 from the sensor 502 and the rotor speed signal 506 from the control system 74 and generates a stability correlation signal 512 in real time using conventional numerical methods. Auto correlation methods available in the published literature may be used for this purpose. In the exemplary embodiments shown herein, the correlation processor 510 algorithm uses the existing speed signal from the engine control system 74 for cycle synchronization. The correlation measure is computed for individual pressure transducers 502 over rotor blade tips 46 of the rotors 12*a*, 12*b*, 12*c* and input signals 504*a*, 504*b*, 504*c*. The auto-correlation system in the exemplary embodiments described herein sampled a signal from a pressure sensor 502 at a frequency of 200 KHz. This relatively high value of sampling frequency ensures that the data is sampled at a rate at least ten times the fan blade 40 passage frequency. A window of seventy two samples was used to calculate the auto-correlation having a value of near unity along the operating line 116 and dropping towards zero when the operation approached the stall/surge line 112 (see FIG. 3).

For a particular fan stage 12a, 12b, 12c when the stability margin approaches zero, the particular fan stage is on the verge of stall and the correlation measure is at a minimum. In the exemplary instability mitigation system 700 (see FIG. 9) disclosed herein designed to avoid an instability such as a stall or surge in a compression system, when the correlation measure drops below a selected and pre-set threshold level, an instability control system 600 receives the stability correlation signal 512 and sends an electrical signal 602 to the engine control system 74, such as for example a FADEC system, and an electrical signal 606 to an electronic controller 72, which in turn can take corrective action using the available control devices to move the engine away from instability such as a stall or surge by raising the stall line as described herein. The methods used by the correlation processor 510 for gauging the aerodynamic stability level in the exemplary embodiments shown herein is described in the paper, *"Development and Demonstration of a Stability Management System for Gas Turbine Engines"*, Proceedings of GT2006 ASME Turbo Expo 2006, GT2006-90324.

FIG. 4 shows schematically an exemplary embodiment of the present invention using a sensor 502 located in a casing 50 near the blade tip mid-chord of a blade 40. The sensor is located in the casing 50 such that it can measure the dynamic pressure of the air in the clearance 48 between a fan blade tip 46 and the inner surface 53 of the casing 50. In one exemplary embodiment, the sensor 502 is located in an annular groove 54 in the casing 50. In other exemplary embodiments, it is possible to have multiple annular grooves 54 in the casing 50, such as for example, to provide for tip flow modifications for stability. If multiple grooves are present, the pressure sensor 502 is located within one or more of these grooves, using the same principles and examples disclosed herein. Although the sensor is shown in FIG. 4 as located in a casing 50, in other embodiments, the pressure sensor 502 may be located in a shroud 51 that is located radially outwards and apart from the blade tip 46. The pressure sensor 502 may also be located in a casing 50 (or shroud 51) near the leading edge 41 tip or the trailing edge 42 tip of the blade 40. The pressure sensor 502 may also be located in a stator stage 31 or on the stator vanes such as 31a, 31b, 31c.

FIG. 9 shows schematically an exemplary embodiment of the present invention using a plurality of sensors 502 in a fan stage, such as item 40a in FIG. 2. The plurality of sensors 502 are arranged in the casing 50 (or shroud 51) in a circumferential direction, such that pairs of sensors 502 are located substantially diametrically opposite. The correlations processor 510 receives input signals 504 from these pairs of sensors and processes signals from the pairs together. The differences in the measured data from the diametrically opposite sensors in a pair can be particularly useful in developing stability correlation signal 512 to detect the onset of a fan stall due to engine inlet flow distortions.

Figure 6:
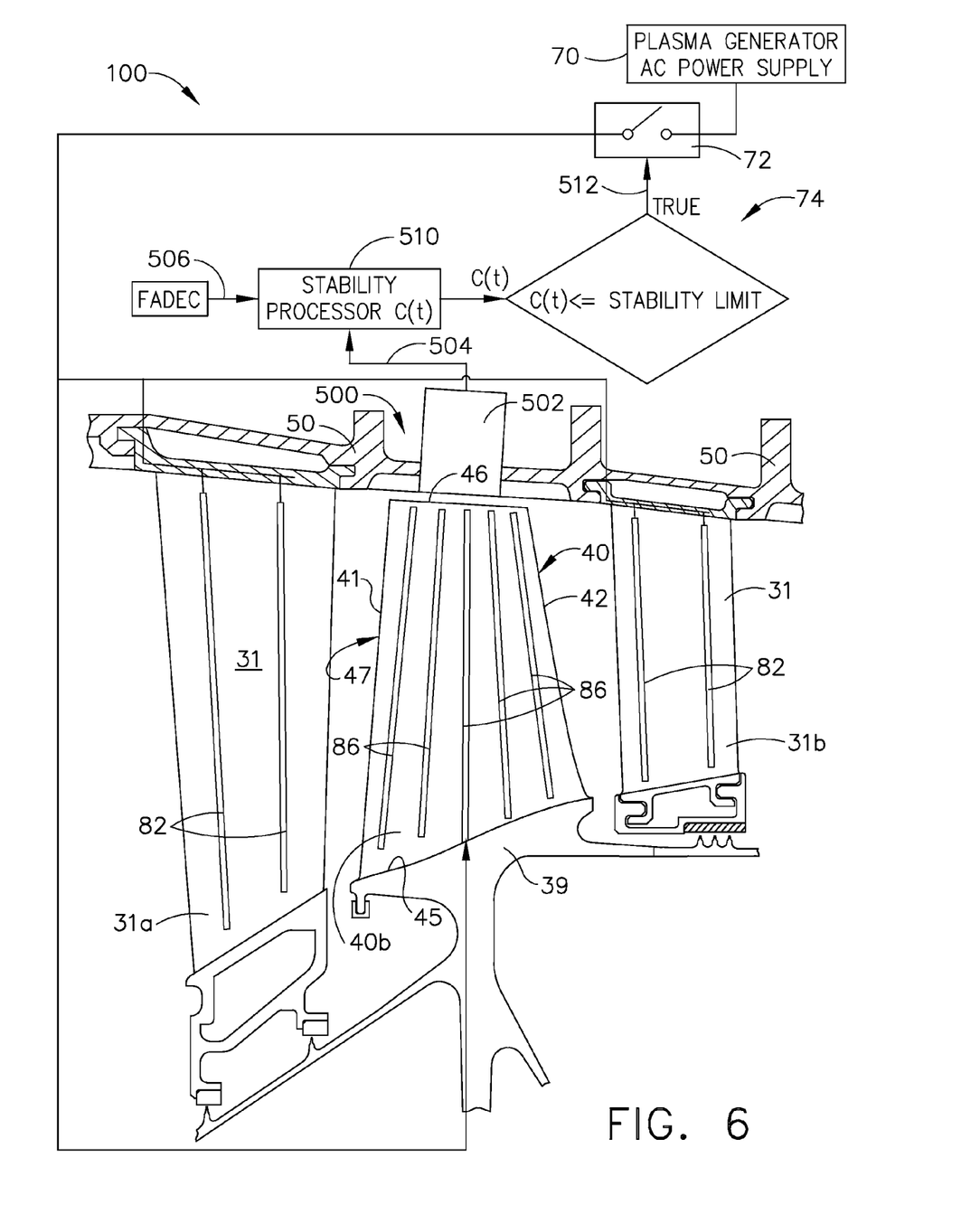
FIG. 6 shows two stator stages having an exemplary arrangement of plasma actuators and a detection system mounted in a static component near rotor blade tip region.
Figure 7:
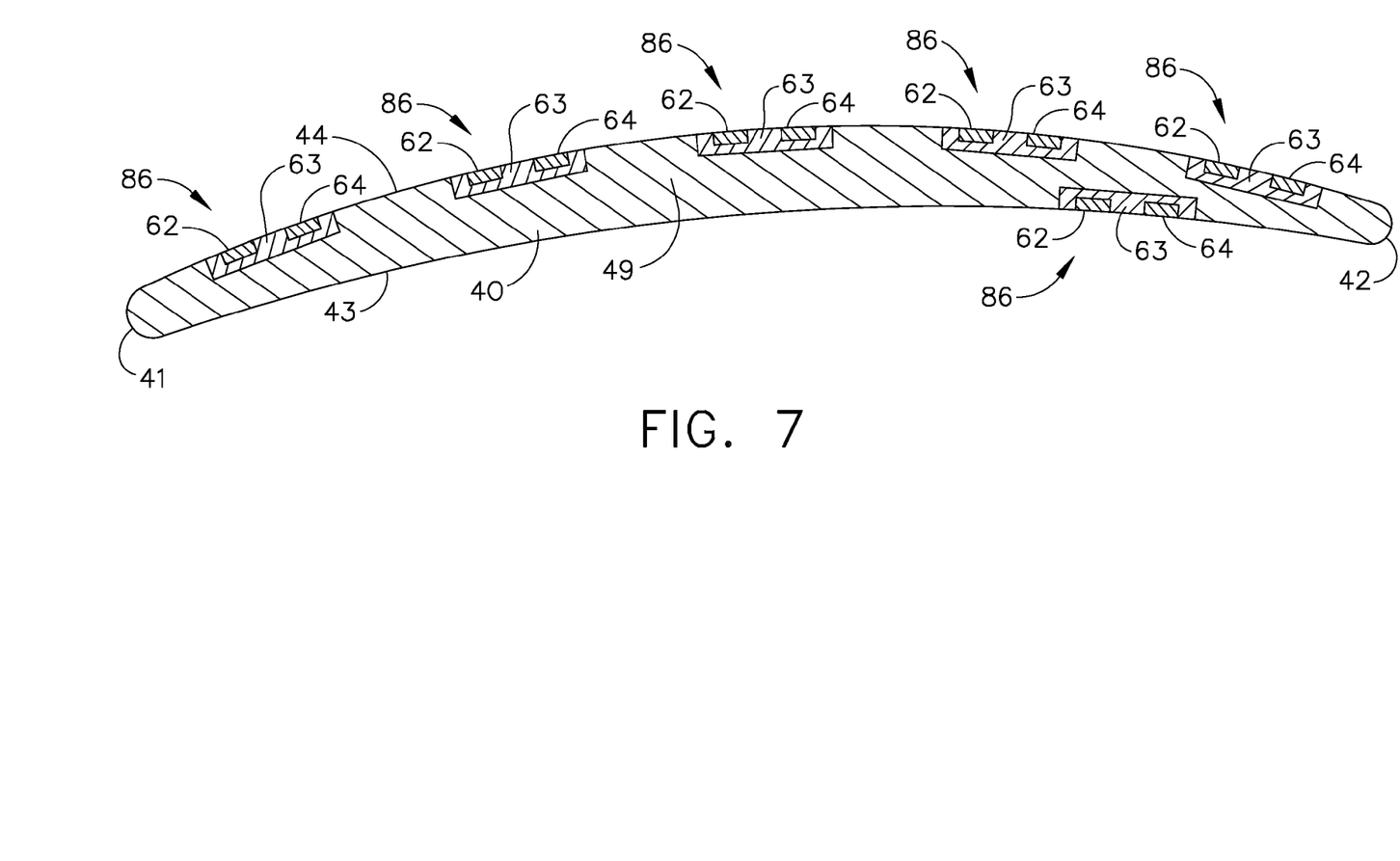
FIG. 7 is a cross sectional view of a rotor blade having an exemplary arrangement of multiple plasma actuators mounted on the airfoil.

FIGS. 1, 6 and 9 show an exemplary embodiment of a mitigation system 300 that facilitates the improvement of the stability of a compression system when an instability is detected by the detection system 500 as described previously. These exemplary embodiments of the invention use plasma actuators disclosed herein to reduce flow separation in stator vane airfoils 35 or rotor blade airfoils 34, and to delay the onset and growth of the blockage by the rotor blade tip leakage vortex described previously herein. Plasma actuators used as shown in the exemplary embodiments of the present invention, produce a stream of ions and a body force that act upon the fluid in the stator vane and rotor blade airfoils, forcing it to pass through the blade passage in the direction of the desired fluid flow, reducing flow separations.

Figure 5:
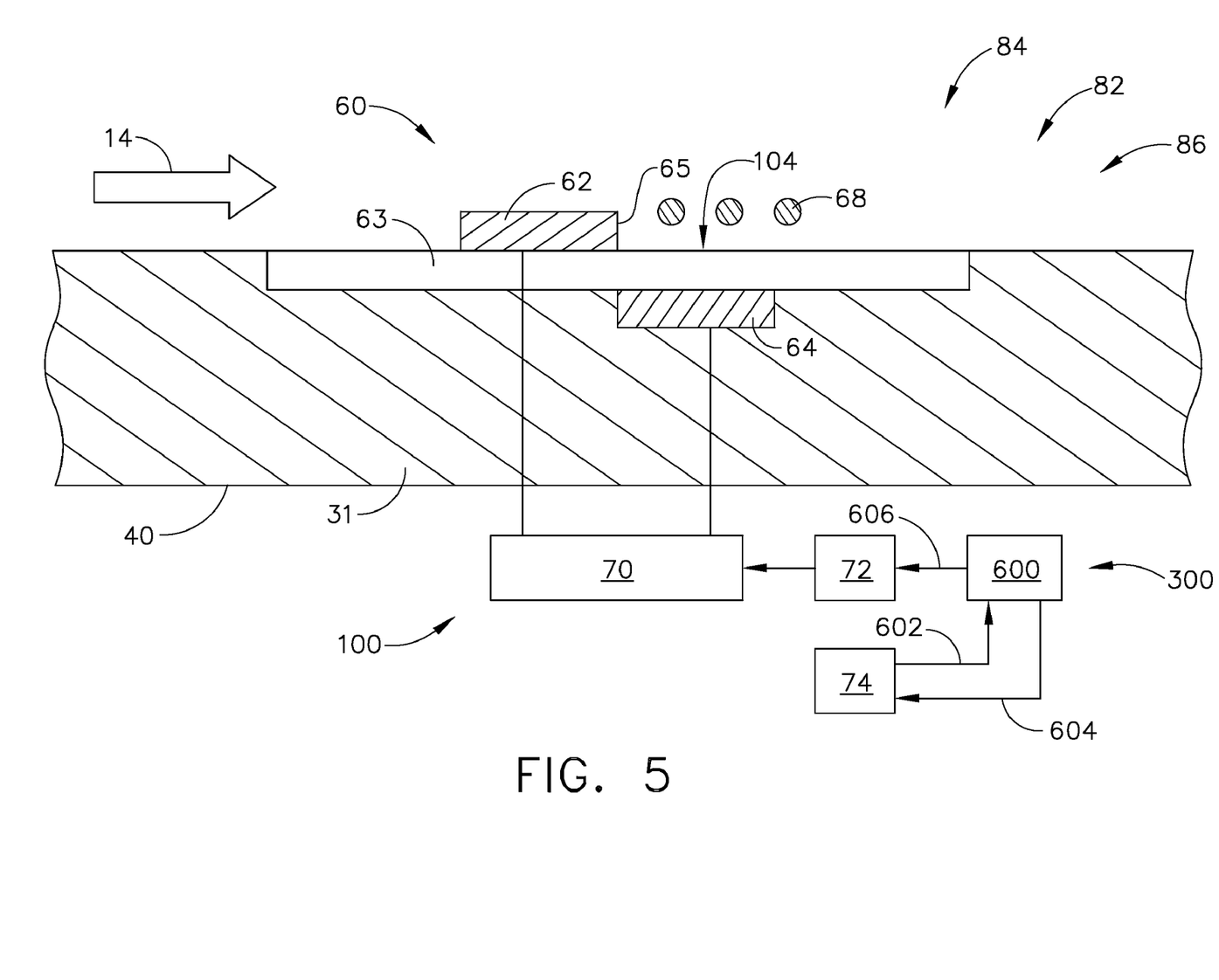
FIG. 5 is a schematic illustration of a mitigation system with a plasma actuator illustrated in FIG. 2 energized.

The terms "plasma actuators" and "plasma generators" as used herein have the same meaning and are used interchangeably. FIG. 5 shows schematically, a plasma actuator 82, 84, 86 illustrated herein (see FIGS. 1, 2, 6, 7, 8, 9) when it is energized. The exemplary embodiment shown in FIG. 5 shows a plasma generator 86 mounted to a rotor blade 40, and includes a first electrode 62 and a second electrode 64 separated by a dielectric material 63. An AC (alternating current) power supply 70 is connected to the electrodes to supply a high voltage AC potential in a range of about 3-20 kV to the electrodes 62, 64. When the AC amplitude is large enough, the air ionizes in a region of largest electric potential forming a plasma 68. The plasma 68 generally begins near an edge 65 of the first electrode 62 which is exposed to the air and spreads out over an area 104 projected by the second electrode 64 which is covered by the dielectric material 63. The plasma 68 (ionized air) in the presence of an electric field gradient produces a force on the air flowing near the airfoils, inducing a virtual aerodynamic shape that causes a change in the pressure distribution along the airfoil surfaces such that flow tends to remain attached to the airfoil surface, reducing flow separations. The air near the electrodes is weakly ionized, and usually there is little or no heating of the air.

Figure 8:
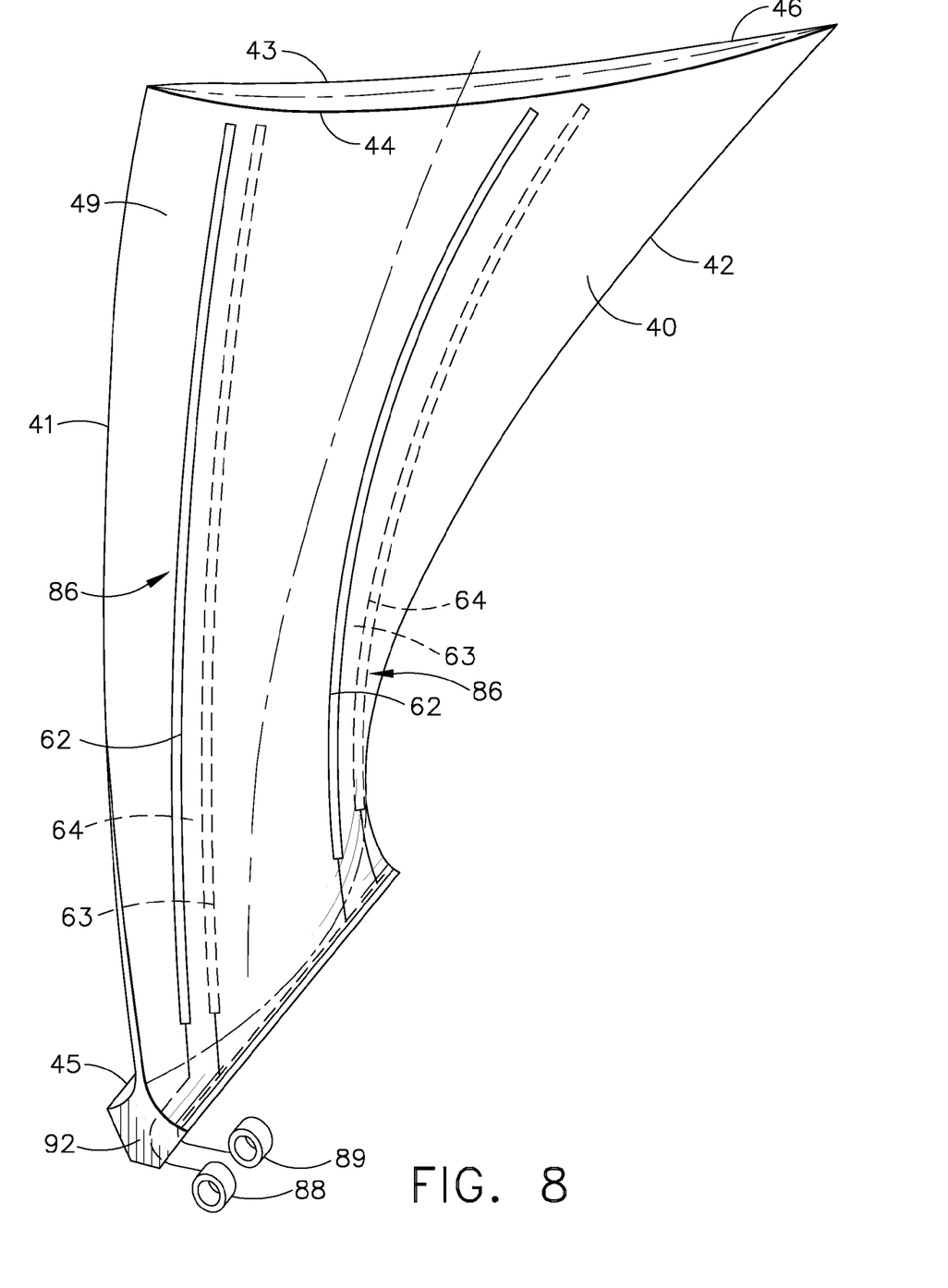
FIG. 8 is an isometric view of a rotor blade having an exemplary arrangement of two plasma actuators mounted in a generally spanwise direction.

FIG. 6 schematically illustrates, in cross-section view, exemplary embodiment of a plasma actuator system 100 for improving the stability of compression systems and/or for enhancing the efficiency of a compression systems. The term "compression system" as used herein includes devices used for increasing the pressure of a fluid flowing through it, and includes the high pressure compressor 18, the booster and the fan 12 used in gas turbine engines shown in FIG. 1. The exemplary embodiments shown herein facilitate an increase in stall margin and/or enhance the efficiency of compression systems in a gas turbine engine 10 such as the aircraft gas turbine engine illustrated in cross-section in FIG. 1. The exemplary gas turbine engine plasma actuator system 100 shown in FIG. 6 includes plasma generators 86 mounted on rotor blades 40b and plasma generators 82 mounted on stator vanes 31a and 31b. The plasma actuators shown in FIG. 6 are mounted in the rotor blade 40b in a generally spanwise direction, from near the blade root to the tip of the airfoils. The plasma actuators 86 are mounted in grooves located on the blade airfoil suction side 44 such that the surfaces remain substantially smooth to avoid disturbing local airflow near the plasma actuators. Suitable covering using conventional materials may be applied on the grooves after the plasma actuators are mounted to facilitate smooth airflow on the airfoil surfaces. Each groove segment has the dielectric material 63 disposed within the groove segment separating the first electrodes 62 and second electrodes 64 disposed within the groove segments, forming the plasma actuator 86. In another embodiment of the present invention, a plurality of plasma actuators 82 are also located on the vane airfoil 35 of stator vanes such as items 31a and 31b in FIG. 6. The plasma actuators are mounted at selected chord lengths from the blade leading edge 41, at locations selected based on the propensity for airflow separation determined by conventional aerodynamic analysis of airflow around the airfoil pressure and suction sides. In another embodiment of the present invention, shown in FIG. 7, plasma actuators 86 may also be placed on the concave side 43 of the blade airfoil 49, especially near the trailing edge 42. FIG. 8 shows a rotor blade 40 having an exemplary embodiment of the present invention wherein the plasma actuator 86 is mounted on the convex side of the blade airfoil 49, oriented in a generally span-wise direction. Alternately, it may be advantageous to mount the plasma actuators at other orientations so as to align the plasma 68 direction along other suitable flow directions as determined by conventional aerodynamic analyses. FIGS. 8 and 9 show schematically conventional slip rings 88 and 89 that may be used to provide electrical connections to the plasma actuators 86 that are mounted on rotating blades 40. Other suitable methods of providing power supply to the plasma actuators 86 on rotating blades may also be used.

FIG. 9 shows schematically an exemplary embodiment of an instability mitigation system 700 according to the present invention. The exemplary instability mitigation system 700 comprises a detection system 500, a mitigation system 300, a control system 74 for controlling the detection system 500 and the mitigation system 300, including an instability control system 600. The detection system 500, which has one or more sensors 502 to measure a flow parameter such as dynamic pressures near blade tip, and a correlations processor 510, has been described previously herein. The correlations processor 510 sends a correlations signals 512 indicative of whether an onset of an instability such as a stall has been detected at a particular rotor stage, or not, to the instability control system 600, which in turn feeds back status signals 604 to the control system 74. The control system 74 supplies information signals 506 related to the compression system operations, such as rotor speeds, to the correlations processor 510. When an onset of an instability is detected and the control system 74 determines that the mitigation system 300 should be actuated, a command signal 602 is sent to the instability control system 600, which determines the location, type, extent, duration etc. of the instability mitigation actions to be taken and sends the corresponding instability control system signals 606 to the electronic controller 72 for execution. The electronic controller 72 controls the operations of the plasma actuator system 100 and the power supply 70. These operations described above continue until instability mitigation is achieved as confirmed by the detection system 500. The operations of the mitigation system 300 may also be terminated at predetermined operating points determined by the control system 74.

In an exemplary instability mitigation system 700 system in a gas turbine engine 10 shown in FIG. 1, during engine operation, when commanded by the instability control system 600 and an electronic controller 72, the plasma actuator system 100 turns on the plasma generator 86, 82 (see FIGS. 6 and 9) to form the plasma 68 between the first electrode 62 and second electrode 64. The electronic controller 72 can also be linked to an engine control system 74, such as for example a Full Authority Digital Electronic Control (FADEC), which controls the fan speeds, compressor and turbine speeds and fuel system of the engine. The electronic controller 72 is used to control the plasma generator 60 by turning on and off of the plasma generator 60, or otherwise modulating it as necessary to enhance the compression system stability by increasing the stall margin or enhancing the efficiency of the compression system. The electronic controller 72 may also be used to control the operation of the AC power supply 70 that is connected to the electrodes to supply a high voltage AC potential to the electrodes.

In operation, when turned on, the plasma actuator system 100 produces a stream of ions forming the plasma 68 and a body force which pushes the air and alters the pressure distribution near the vane airfoil pressure and suction sides. The body force applied by the plasma 68 forces the air to pass through the passage between adjacent blades, in the desired direction of positive flow, reducing flow separations near the airfoil surfaces and the blade tips. This increases the stability of the fan or compressor rotor stage and hence the compression system. Plasma generators 82, 86, such as for example, shown in FIG. 6, may be mounted on airfoils of some selected fan or compressor stator and rotor stages where stall is likely to occur. Alternatively, plasma generators may be located along the spans of all the compression stage blades 40 and vanes 31a and selectively activated by the instability control system 600 during engine operation using the engine control system 74 or the electronic controller 72. In another exemplary embodiment of the present invention, shown in FIG. 2, plasma actuators 84 are mounted on the IGV flap 32, oriented in a generally spanwise direction. The IGV Flap 32 is movable in order to orient the direction of the airflow entering the first fan rotor 12a. By energizing the plasma actuators 84, 86 it is possible to extend the range of motion that can be achieved for the IGV flap 32 without flow separation. This is especially useful in gas turbine engine applications where severe inlet flow distortions exist under certain circumstances.

In other exemplary embodiments of the present invention, it is possible to have multiple plasma actuators placed at multiple locations in the compressor casing 50 or the shroud segments 51, in addition to the plasma actuators mounted on rotor blade airfoils 49 and stator vane airfoils 35.

The plasma actuator systems disclosed herein can be operated to effect an increase in the stall margin of the compression systems in the engine by raising the stall line, such as for example shown by the enhanced stall line 113 in FIG. 3. Although it is possible to operate the plasma actuators continuously during engine operation, it is not necessary to operate the plasma actuators continuously to improve the stall margin. At normal operating conditions, blade tip vortices and small regions of reversed flow may exist in the rotor tip region 52. It is first necessary to identify the fan or compressor operating points where stall is likely to occur. This can be done by conventional methods of analysis and testing and results can be represented on an operating map, such as for example, shown in FIG. 3. Referring to FIG. 3, at normal operating points on the operating line 116, for example, the stall margins with respect to the stall line 112 are adequate and the plasma actuators need not be turned on. However, as the compression system is throttled such as for example along the constant speed line 122, or during severe inlet air flow distortions, the axial velocity of the air in the compression system stage over the entire stator vane span or rotor blade span decreases, especially in the tip region 52. This axial velocity drop, coupled with higher pressure rise in the rotor blade tip 46, increases the flow over the rotor blade tip and the strength of the tip vortex, creating the conditions for a stall to occur. As the compression system operation approaches conditions that are typically near stall the stall line 112, the plasma actuators are turned on. The plasma actuators may be turned on by the instability control system 600 based on the detection system 500 input when the measurements and correlations analyses from the detection system 500 indicate an onset of an instability such as a stall or surge. The control system 74 and/or the electronic controller is set to turn the plasma actuator system on well before the operating points approach the stall line 112 where the compressor is likely to stall. It is preferable to turn on the plasma actuators early, well before reaching the stall line 112, since doing so will increase the absolute throttle margin capability. However, there is no need to expend the power required to run the actuators when the compressor is operating at healthy, steady-state conditions, such as on the operating line 116.

Alternatively, instead of operating the rotor plasma actuators 86, stator plasma actuators 82, and IGV plasma actuators 84 in a continuous mode as described above, the plasma actuators can be operated in a pulsed mode. In the pulsed mode, some or all of the plasma actuators 82, 84, 86 are pulsed on and off at ("pulsing") some pre-determined frequencies. It is known that the tip vortex that leads to a compressor stall generally has some natural frequencies, somewhat akin to the shedding frequency of a cylinder placed into a flow stream. For a given rotor geometry, these natural frequencies can be calculated analytically or measured during tests using unsteady flow sensors. These can be programmed into the operating routines in a FADEC or other engine control systems 74 or the electronic controller 72 for the plasma actuators. Then, the plasma actuators 82, 84, 86 can be rapidly pulsed on and off by the control system at selected frequencies related, for example, to the vortex shedding frequencies or the blade passing frequencies of the various compressor stages. Alternatively, the plasma actuators can be pulsed on and off at a frequency corresponding to a "multiple" of a vortex shedding frequency or a "multiple" of the blade passing frequency. The term "multiple", as used herein, can be any number or a fraction and can have values equal to one, greater than one or less than one. The plasma actuator 82, 84, 86 pulsing can be done in-phase with each other. Alternatively, the pulsing of the plasma actuators 82, 84, 86 can be done out-of-phase, at selected phase angles, with other. The phase angle may vary between about 0 degree and 180 degrees. It is preferable to pulse the plasma actuators approximately 180 degrees out-of-phase with the vortex frequency to quickly break down the blade tip vortex as it forms. The plasma actuator phase angle and frequency may selected based on the detection system 500 measurements of the tip vortex signals using probes mounted in stator stages or near the blade tip as described previously herein.

During engine operation, the mitigation system 300 turns on the plasma generator, such as the rotor plasma actuator 86, to form the plasma 68 between the first electrode 62 and the second electrode 64. An electronic controller 72 may be used to control the plasma generator 82, 84, 86 and the turning on and off of the plasma generators. The electronic controller 72 may also be used to control the operation of the AC power supply 70 that is connected to the electrodes 62, 64 to supply a high voltage AC potential to the electrodes 62, 64.

The cold clearance between the annular casing 50 (or the shroud segments 51) and blade tips 46 is designed so that the blade tips do not rub against the annular casing 50 (or the shroud segments 51) during high powered operation of the engine, such as, during take-off when the blade disc and blades expand as a result of high temperature and centrifugal loads. The exemplary embodiments of the plasma actuator systems illustrated herein are designed and operable to activate the plasma generator 82, 84, 86 to form the plasma 68 during conditions of severe inlet flow distortions or during engine transients when the operating line is raised (see item 114 in FIG. 3) where enhanced stall margins are necessary to avoid a fan or compressor stall, or during flight regimes where clearances 48 have to be controlled such as for example, a cruise condition of the aircraft being powered by the engine. Other embodiments of the exemplary plasma actuator systems illustrated herein may be used in other types of gas turbine engines such as marine or perhaps industrial gas turbine engines.

The exemplary embodiments of the invention herein can be used in any compression sections of the engine 10 such as a booster, a low pressure compressor (LPC), high pressure compressor (HPC) 18 and fan 12 which have annular casings or shrouds and rotor blade tips.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An instability mitigation system for a rotor, the system comprising:
    a detection system comprising a sensor capable of generating an input signal corresponding to a flow parameter;
    a correlation processor that receives the input signal and a rotor speed signal and generates a stability correlation signal;
    a mitigation system that facilitates the improvement of the stability of the rotor when an onset of instability is detected by the detection system wherein the mitigation system comprises at least one plasma actuator mounted on a blade; and
    a control system for controlling the detection system and the mitigation system;
    wherein the control system comprises a controller that controls an AC potential applied to a first electrode and a second electrode of the plasma actuator; and
    wherein the controller controls the AC potential by pulsing the AC potential at a selected frequency.

2. An instability mitigation system according to claim 1 wherein the controller controls the AC potential by pulsing the AC potential at a frequency that is a multiple of a number blades in the rotor.

3. An instability mitigation system according to claim 1 wherein the plasma actuator is mounted in a generally spanwise direction on a convex side of a blade airfoil.

4. An instability mitigation system according to claim 1 wherein the plasma actuator is mounted in a generally spanwise direction on a concave side of a blade airfoil.

5. An instability mitigation system according to claim 1, wherein the detection system further comprises a plurality of sensors arranged circumferentially on a static component around a centerline axis.

6. An instability mitigation system according to claim 1, wherein the sensor is located on a static component spaced radially outwardly and apart from tips of a row of blades arranged circumferentially on the rotor.

7. An instability mitigation system according to claim 1, wherein the sensor is capable of generating the input signal corresponding to the flow parameter at a location near a tip of the blade.

8. An instability mitigation system for a rotor, the system comprising:
    a detection system comprising a sensor capable of generating an input signal corresponding to a flow parameter;
    a correlation processor that receives the input signal and a rotor speed signal and generates a stability correlation signal;
    a mitigation system that facilitates the improvement of the stability of the rotor when an onset of instability is detected by the detection system wherein the mitigation system comprises at least one plasma actuator mounted on a blade; and
    a control system for controlling the detection system and the mitigation system;
    wherein the control system comprises a controller that controls an AC potential applied to a first electrode and a second electrode of the plasma actuator; and wherein the controller pulses the AC potential in-phase with a multiple of the vortex shedding frequency at a blade tip.

9. An instability mitigation system according to claim 8, wherein the sensor is capable of generating the input signal corresponding to the flow parameter at a location near the tip of the blade.

10. An instability mitigation system according to claim 8, wherein the correlation processor generates the stability correlation signal based on the input signal and the rotor speed signal.

11. An instability mitigation system according to claim 8, wherein the sensor is located on a stator stage.

12. An instability mitigation system according to claim 8 wherein the plasma actuator is mounted in a generally span-wise direction on a convex side of a blade airfoil.

13. An instability mitigation system according to claim 8 wherein the plasma actuator is mounted in a generally span-wise direction on a concave side of a blade airfoil.

14. An instability mitigation system for a rotor, the system comprising:
   a detection system comprising a sensor capable of generating an input signal corresponding to a flow parameter;
   a correlation processor that receives the input signal and a rotor speed signal and generates a stability correlation signal;
   a mitigation system that facilitates the improvement of the stability of the rotor when an onset of instability is detected by the detection system wherein the mitigation system comprises at least one plasma actuator mounted on a blade; and
   a control system for controlling the detection system and the mitigation system;
   wherein the control system comprises a controller that controls an AC potential applied to a first electrode and a second electrode of the plasma actuator; and
   wherein the controller pulses the AC potential out-of-phase with a multiple of the vortex shedding frequency at a blade tip.

15. An instability mitigation system according to claim 14, wherein the sensor is capable of generating the input signal corresponding to the flow parameter at a location near the tip of the blade.

16. An instability mitigation system according to claim 14, wherein the correlation processor generates the stability correlation signal based on the input signal and the rotor speed signal.

17. An instability mitigation system according to claim 14, wherein the sensor is located on a stator stage.

18. An instability mitigation system according to claim 14 wherein the plasma actuator is mounted in a generally span-wise direction on a convex side of a blade airfoil.

19. An instability mitigation system according to claim 14 wherein the plasma actuator is mounted in a generally span-wise direction on a concave side of a blade airfoil.

* * * * *